United States Patent [19]

Legrow et al.

[11] Patent Number: 5,017,221

[45] Date of Patent: May 21, 1991

[54] POLYMETHYLALKYLSILOXANE EMULSIONS AND METHODS

[75] Inventors: Gary E. Legrow; Donald T. Liles, both of Midland County, Mich.

[73] Assignee: Dow Corning Corporation, Midland, Mich.

[21] Appl. No.: 446,510

[22] Filed: Dec. 5, 1989

[51] Int. Cl.$^5$ .............................................. C09K 3/18
[52] U.S. Cl. .......................................... 106/2; 106/3; 106/10; 106/287.15
[58] Field of Search ................... 106/2, 3, 10, 287.15

[56] References Cited

U.S. PATENT DOCUMENTS

| | | | |
|---|---|---|---|
| 3,392,040 | 7/1968 | Kass | 106/287.15 |
| 3,395,028 | 7/1968 | Mackles | 106/10 |
| 3,956,174 | 5/1976 | Palcher | 252/400 |
| 4,133,921 | 1/1979 | Palcher | 427/355 |
| 4,462,828 | 7/1984 | Otsuki | 106/3 |
| 4,620,878 | 11/1986 | Gee | 106/287.15 |
| 4,631,273 | 12/1986 | Blehm et al. | 514/29 |
| 4,640,792 | 2/1987 | Groenhof | 252/78.3 |
| 4,732,612 | 3/1988 | Steer et al. | 106/10 |
| 4,810,407 | 3/1989 | Sandvick | 106/3 |

Primary Examiner—Mark L. Bell
Assistant Examiner—Helene Klemanski
Attorney, Agent, or Firm—Jim L. DeCesare

[57] ABSTRACT

An emulsion and a mixture including water, at least one surfactant, and a polymethylalkylsiloxane. The polymethylalkylsiloxane has the formula:

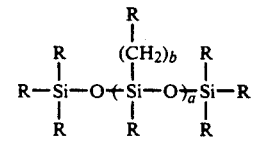

wherein R is a methyl radical, a is an integer from one to about three thousand, and b is an integer from one to about ten. Also disclosed is a method of rendering a surface repellent to water by treating the surface with an effective amount of the foregoing emulsion. The surface being treated is an organic surface, and can be a rubber surface such as wires, cables, the sidewall of a pneumatic tire, footwear, molded goods, and coated fabrics. The surface can also be a vinyl surface such as flooring, shower curtains, rain coats, automative seat upholstery, residential siding, and piping.

15 Claims, No Drawings

POLYMETHYLALKYLSILOXANE EMULSIONS AND METHODS

BACKGROUND OF THE INVENTION

This invention relates to an emulsion of water, at least one surfactant, and a polymethylalkylsiloxane. A method of using the emulsion for the treatment of organic surfaces such as rubber and vinyl is also disclosed.

One of the most important commerical applications of rubber is the pneumatic tire. Because of the increased demand for speed and endurance in modern vehicles, it has become necessary to design rubber compounds and build tires with such factors in mind. Tires must be designed to withstand heavy loads and high speeds for prolonged periods of time, and the body of the tire must be capable of withstanding severe shock, and must not exhibit excessive heat build-up. In addition to performance, a tire should also have a clean, shiny, appearance. Heavily soiled tires can detract from the appearance of an otherwise expensive vehicle. Most often, soiled surfaces of tires are caused by rain, dirt, road salt, water, and snow.

Aqueous emuslion of polydimethysiloxane fluids have been applied to many surfaces as a protective coating including rubber, vinyl, plastic, leather, and sealed wood. Some of these surfaces have also been found to have been rendered anti-static for the purpose of repelling dust and dirt. However, when such emuslions are employed as protective coating in outdoor applications, such as the sidewall of an automboile tire, the polydimethlsiloxane coatings are rapidly removed and rendered ineffective by water which is encountered while driving in rain or snow. In order to restore the appearance of the soiled tire, another and more often, repeated applications of the polydimethlsiloxane emulsion is required. This, of course, is a disadvantage and a time consuming task. Exemplary of such polydimethylsiloxane emulsion coatings are U.S. Pat. No. 3,956,174, issued May 11, 1976, and U.S. Pat. No. 4,133,921, issued Jan. 9, 1979.

In accordance with the presenct invention, new and improved protective coatings for surfaces such as rubber are provided, and in which frequent reapplication of the coating is not required. The coatings of the present invention are directed to emulsions containing polymethylalkylsiloxanes, rather than polydimethylsiloxanes as in the prior art. Such coatings have been found to possess superior gloss, luster, shine, and repellent characteristics, and soiled surfaces may be merely rinsed clean without requiring frequent reapplication of the coating to a tire sidewall, for example. While polymethylalkylsiloxanes are not new as evidenced by U.S. Pat. No. 4,640,792, issued Feb. 3, 1987, emulsion of such compounds and their application to surfaces such as rubber and vinyl as protective coatings is new and novel.

SUMMARY OF THE INVENTION

This invention relates to an emulsion and a mixture including water, as least one surfactant, and a polymethylalkylsiloxane. The polymethylalkylsiloxane has the formula:

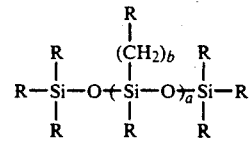

wherein R is a methyl radical, $a$ is an integer from one to about three thousand, and $b$ is an integer from one to about ten.

In the more preferred and alternate embodiments of the invention, the surfactant can be a cationic, nonionic, and amphoteric surfactant, or mixtures thereof. The emulsion includes an amount of water sufficient to provide a transparent mixture. The emulsion may also contain a polyglycol such as ethylene glycol, propylene glycol, butylene glycol, mixtures, and copolymers thereof. Ethylene glycol is the most preferred polyglycol. The polymethylalkylsiloxane has a viscosity in the range of from about twenty to about fifty thousand centistokes measured at twenty-five degrees Centigrade, preferably about two hundred to about three thousand centistokes, with a viscosity of about three hundred-fifty centistokes being the most preferred. The integer $b$ in the above formula for the polymethylalkylsiloxane is five in the most preferred embodiment, in which the polymethlalkylsiloxane is polymethyl n-hexylsiloxane, in which cause the integer $a$ in the formula is about thirty-five.

The invention also is directed to a method of rendering a surface repellent to water by treating the surface with an effective amount of the foregoing emulsion. The surface being treated is an organic surface, and can be a rubber surface such as wires, cables, the sidewall of a pheumatic tire, footwear, molded goods, and coated fabrics. The surface can also be a vinyl surface such as flooring; shower curtains; rain coats; automotive convertible tops, vinyl tops, tonneau covers, and seat upholstery; residential siding; and piping.

These and other features, objects, and advantages, of the herein described present invention will become more apparent from a consideration of the following detailed description thereof.

DETAILED DESCRIPTION OF THE INVENTION

In the example which follow, it will be seen that the surface treatments produced in accordance with the present invention provide a higher luster and require only a single application of the emulsion to the surface, in comparison to conventionally available surface treatment compositions. In fact, following as many as three applications, other types of protective coatings did not provide comparable luster to the surfaces treated in accordance with this invention. Following exposure to water, snow, and road salt, the polymethylalkylsiloxane emulsion coatings of the instant invention were unchanged, and the surface to which the coating had been applied was washed free of road salt revealing a clean surface of high gloss. Surfaces treated with the protective coatings of the prior art were depleted by exposure and upon rinsing revealed surfaces which were heavily soiled.

The increased efficiency of the protective coating of the present invention can be attributed to the fact that alkylmethylsiloxanes possess a more pronounced attraction to organic surfaces than possessed by polydimethylsiloxane fluids. This is believed due to the presence in the molecule of the alkyl group which has great affinity for surfaces such as rubber and vinyl. Hence, the alkylmethylsiloxanes of this invention provide a more permanent surface treatment characteristic than do prior art treatments, with the result that frequent applications of the surface coating are not required. The alkylmethylsiloxanes are not chemically bonded to the surfaces to which they have been applied, but such coatings remain on the surface for a more extensive period of time because of the great affinity of the alkyl groups in the molecule for the organic surface. This is of particular significance in outdoor applications where the surfaces are exposed to weathering conditions.

While the alkylmethylsiloxanes of the present invention may be prepared in accordance with conventional procedures for the production of dimethylsiloxane materials, the preferred method involves the hydrosilylation of a hydrogenmethylsiloxane with an alpha olefin. For example, hydrosilylation of 1-hexene can be conducted with $Me_3SiO(MeHSiO)_{35}SiMe_3$ in the presence of a platinum-carbon catalyst. The product is heated and evacuated to remove excess 1-hexene resulting in the production of a polymethylalkylsiloxane which is poly(n-hexyl)methylsiloxane.

Emulsions containing the polymethylalkylsiloxanes of the present invention may be prepared by standard emulsion techniques such as those techniques described in U.S. Pat. No. 4,620,878, issued Nov. 4, 1986, which is exemplary. While nonionic surfactants are preferred in accordance with the procedures of the present invention other types of surfactants, especially the nonionic types detailed in the '878 patent, may be employed herein. U.S. Pat. No. 4,620,878, is therefore considered incorporated herein by reference. Other emulsion techniques and surfactants are described in U.S. Pat. No. 4,631,273, issued Dec. 23, 1986, which is also considered incorporated herein by reference.

The polymethylalkylsiloxanes used to prepare the emulsions in accordance with the present invention are generally of the formula:

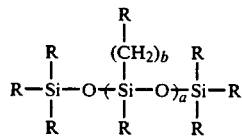

wherein R is a methyl radical, $a$ is an integer from one to about three thousand, and $b$ is an integer from one to about ten. The alkyl group is intended to comprehend ethyl, propyl, butyl, n-pentyl, isopentyl, n-hexyl, n-heptyl, n-octyl, n-nonyl, and n-decyl, for example.

As will be seen in the following examples, aqueous emulsions of n-hexylmethylsiloxane were applied to two tires of an automobile and to an exterior vinyl wheel cover of the vehicle. The other two tires of the vehicle received an application of a comparative surface treatment which was a coating of ARMOR ALL PROTECTANT. This compartive ARMOR ALL PROTECTANT is an emulsion similar to the emulsion of the present invention, except that the ARMOR ALL PROTECTANT contains polydimethylsiloxane instead of polymethylalkylsiloxane. It was found that the emuslion of the present invention could be spread on the surface of the tire sidewall with a cloth and did not drain from the sidewall surface in excess as did the comparative composition. A single treatment of the emulsion of the present invention produced a continuous high gloss coating of both the rubber and vinyl surfaces treated, however, following three treatments with the comparative product, the other two tires did not exhibit an equivalent high gloss appearance. This procedure was followed with respect to several vehicles, and the vehicles were driven and exposed to water, snow, and road salt, for three months. The coatings on the several vehicles were also exposed to strong detergents in automatic car wash facilities on an average of six occasions on each vehicle during this period. The coatings on the several vehicles were inspected during and after each wash. This inspection revealed that the tires coated with the comparative product had lost their shiny appearance and did not repel water after the first strong detergent exposure, but that the tires and the vinyl wheel cover treated with the compositions of the present invention continued to show a lustrous appearance and repelled water even after six strong detergent washes. In addition, the dirt and salt were removed from the tires treated with the compositions of the present invention without any abrasive action.

In the following examples, TERGITOL ® TMN-6 is a trademark of Union Carbide Corporation, New York, New York, and a nonionic surfactant. TRITON ® W-30 is also a nonionic surfactant and a trademark of Rohm and Haas Co., Philadelphia, Pa. The catalyst employed was a platinum-carbon catalyst.

EXAMPLE I

To 630 g. of 1-hexene and 5.0 g of 0.5% Pt/C catalyst was slowly added 300 g. of $[Me_3SiO(HMeSiO)_{35}SiO-Me_3]$. The reaction was heated to reflux however, the reaction became exothermic and further heating was not necessary to maintain a reflux of 1-hexene. The mixture was maintained at reflux for 1 hour to complete the hydrosilylation reaction. The mixture was filtered to remove the catalyst and vacuum stripped with heating using a water aspirator and a heating mantle to remove the excess 1-hexene. The product weighted 700 grams and was a clear colorless fluid of n-hexylmethylsiloxane having a viscosity of about 350 centistokes.

EXAMPLE II 82.5 g. of distilled water, 28.5 g. of Tergitol ® TMN-6 surfactant and 6.4 g. of Triton ® W-30 surfactant were weighed into a 1 liter stainless steel beaker. The mixture was stirred at room temperature for several minutes, and 450 g. of poly(n-hexylmethylsiloxane) fluid of Example I was slowly poured into this mixture with stirrings. After all of the silicone fluid had been added, stirrings was continued for an additional 10 minutes. The mixture was homogenized by using a laboratory homogenizer for one pass at 7000 psi. To 330 g. of the resulting emulsion was added with stirring, a solution of 0.6 g. of sodium bicarbonate, and 1.1 g. of ethylene glycol in 96 g. of distilled water. The mixture was stirred for several minutes until the emulsion was thoroughly diluted and had a uniform appearance. This diluted emulsion contained approximately 60 percent silicone oil as an oil in water, non-ionic emulsion.

EXAMPLE III

To a portion of the 60 per cent aqueous n-hexylmethylsiloxane emulsion of example II was added sufficient distilled water to make an emulsion having 20 percent by weight silicone oil. The diluted emulsion was mixed thoroughly and placed in an empty spray container. This emulsion was spray applied to the left front and right rear tires of a 1982 Dodge Van. ARMOR ALL PROTECTANT was spray applied to the right front and left rear tires of the same vehicle. The standard product did not produce the same shiny surface as the n-hexylmethylsiloxane emulsion, and three applications were applied to the right front and left rear tires. Even with three applications, the ARMOR ALL PROTECTANT did not produce a coating with the same luster as the coating produced by a single application of the n-hexylmethylsiloxane emulsion. The n-hexylmethylsiloxane aqueous emulsion was spray applied to the vinyl cover of the spare tire in a single application. The n-hexylmethylsiloxane aqueous emulsion was spray applied to all 4 tires of a 1984 Dodge 600 and 1985 Ford Escort, and single applications were made. All vehicles were exposed to rain, snow and salt over a period of one week. At the end of this time, the n-hexylmethylsiloxane coated tires and vinyl cover still retained their luster and were readily washed free of salt and dirt. The ARMOR ALL coated tires lost their original less than lustrous appearance. A water rinse did not remove road deposits from these tires. The 1984 Dodge 600 had color matched enamel painted aluminum wheels. The n-hexylmethylsiloxane emulsion was applied to one of these wheels. The other uncoated wheels showed considerable dirt pickup, while the siloxane-coated wheel retained its luster. One application of the n-hexylmethylsiloxane emulsion was also applied to the black vinyl convertible roof of the 1984 Dodge 600 and to the black vinyl convertible roof of a 1969 E-Type Jaguar. This single application rendered the roofs of these vehicles water repellent and minimized dirt pickup for in excess of 6 months. Another observation concerning both of these treated convertible tops was that when exposed to rain, runoff down the painted side of the vehicle did not leave streaks. This is another indication that hexylmethylsiloxane is strongly substantive to the vinyl surface.

EXAMPLE IV

Example I was repeated and n-hexylmethylsiloxane fluids of viscosity of 1942 centistokes measured at zero degrees Centigrade, and 744 centistokes measured at twenty degrees Centigrade, were produced. An n-octylmethylsiloxane of viscosity of 716 centistokes measured at twenty degrees Centigrade was also produced. These fluids were emulsified as in Example II and tested as in Example III, and performed similarly to the emulsion tested in Example III.

It will be apparent from the foregoing that many other variations and modifications may be made in the compounds, compositions, structures, articles, and methods, described herein, without departing substantially from the essential features and concepts of the present invention. Accordingly, it should be clearly understood that the forms of the invention described herein are exemplary only and are not intended as limitations on the scope of the present invention as defined in the appended claims.

What is claimed is:

1. An emulsion comprising a mixture including water, at least one surfactant, and a polymethylalkylsiloxane, the polymethylalkylsiloxane having the formula:

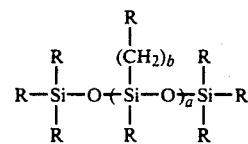

wherein R is a methyl radical, $a$ is an integer from one to about three thousand, and $b$ is an integer from two to about ten, the emulsion including a polyglycol selected from the group consisting of ethylene glycol, propylene glycol, butylene glycol, mixtures, and copolymers thereof.

2. The emulsion of claim 1 in which the polymethylalkylsiloxane has a viscosity in the ring of from about twenty to about fifty thousand centistokes measured at twenty-five degrees Centigrade.

3. The emulsion of claim 2 in which the polymethylalkylsiloxane is polymethyl(n-hexyl) siloxane.

4. The emuslion of claim 2 in which the polymethylalkylsiloxane is polymethyl(n-octyl) siloxane.

5. A method of rendering a surface repellent to water comprising treating the surface with an effective amount of an emulsion including water, at least one surfactant, and a polymethylalkylsiloxane, the polymethylalkylsiloxane having the formula:

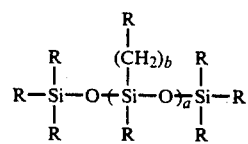

wherein R is a methyl radical, $a$ is an integer from one to about three thousand, and $b$ is an integer from two to about ten, the emulsion including a polyglycol selected from the group consisting of ethylene glycol, propylene glycol, butylene glycol, mixtures, and copolymers thereof.

6. The method of claim 5 in which the polymethylalkylsiloxane has a viscosity in the range of from about twenty to about fifty thousand centistokes measured at twenty-five degrees Centigrade.

7. The method of claim 5 in which the integer $b$ in the formula for the polymethylalkylsiloxane is five to seven.

8. The method of claim 7 in which the polymethylakylsiloxane is polymethyl(n-hexyl) siloxane.

9. The method of claim 5 wherein the surface being treated is a rubber surface selected from the group consisiting of wire, cables, the sidewall of a pneumatic tire, footwear, molded goods, and coated fabrics.

10. The method of claim 7 in which the polymethylalkylsiloxane is polymethyl(n-octyl)siloxane.

11. An emulsion consisting essentially of a mixture of water, at least one surfactant, and a polymethylalkylsiloxane, the polymethylalkylsiloxane having the formula:

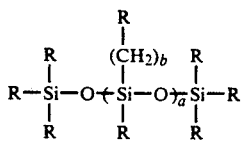

wherein R is a methyl radical, *a* is an integer from one to about three thousand, and *b* is an integer from five to seven.

12. The emulsion of claim 11 including a polyglycol selected from the group consisting of ethylene glycol, propylene glycol, butylene glycol, mixtures, and copolymers thereof.

13. The emulsion of claim 12 in which the polymethylalkylsiloxane has a viscosity in the range of from about twenty to about fifty thousand centistokes measured at twenty-five degrees Centigrade.

14. The emulsion of claim 13 in which the polymethylalkylsiloxane is polymethyl(n-hexyl)siloxane.

15. The emulsion of claim 13 in which the polymethylalkylsiloxane is polyemthyl(n-octyl)siloxane.

* * * * *